April 19, 1960 R. T. FRIEDEL 2,933,031
AUTOMATIC LIGHT CHANGER FOR MOTION PICTURE PRINTERS
Filed March 21, 1958 5 Sheets-Sheet 1
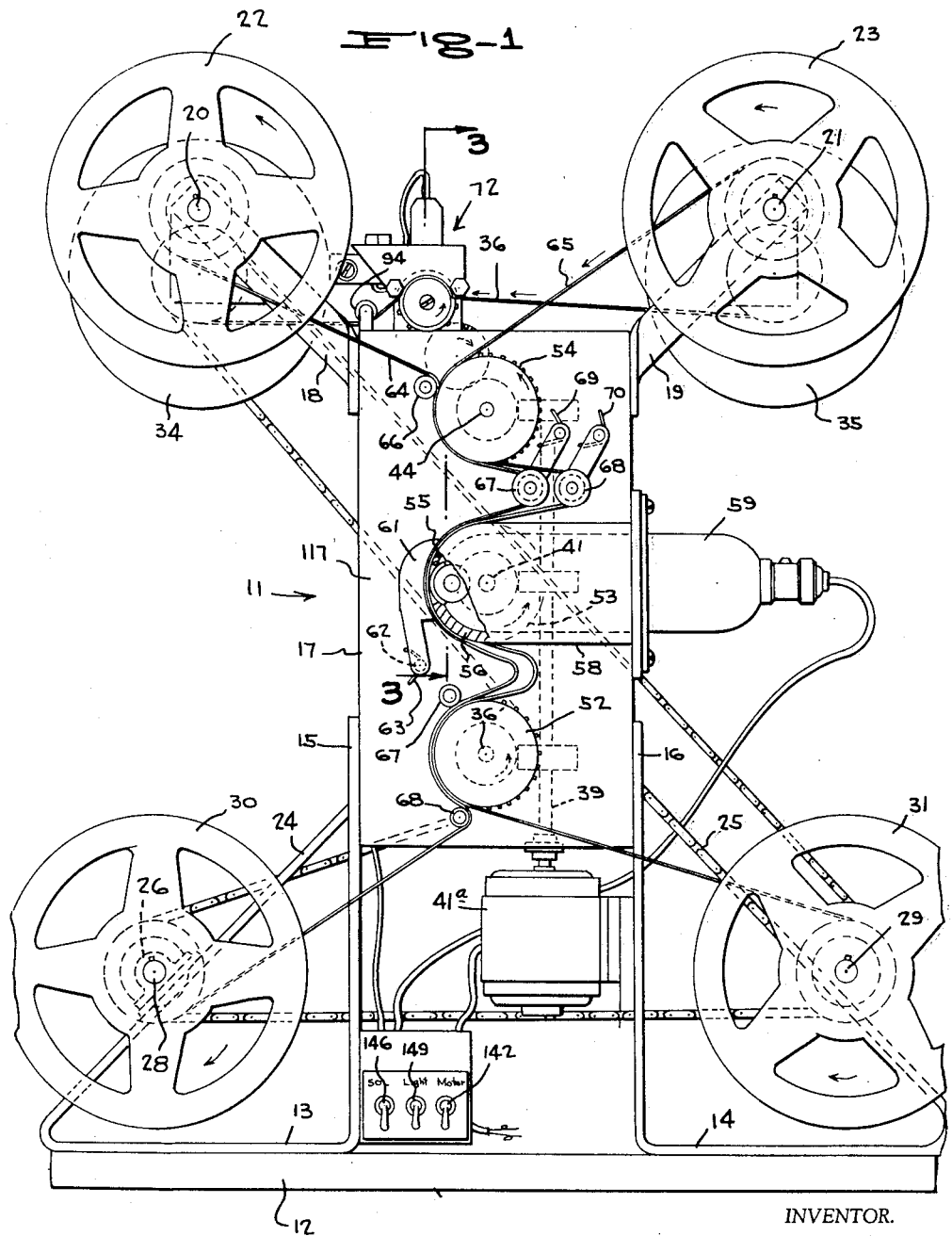
INVENTOR.
RICHARD T. FRIEDEL
BY
McMorrow, Berman & Davidson
ATTORNEYS

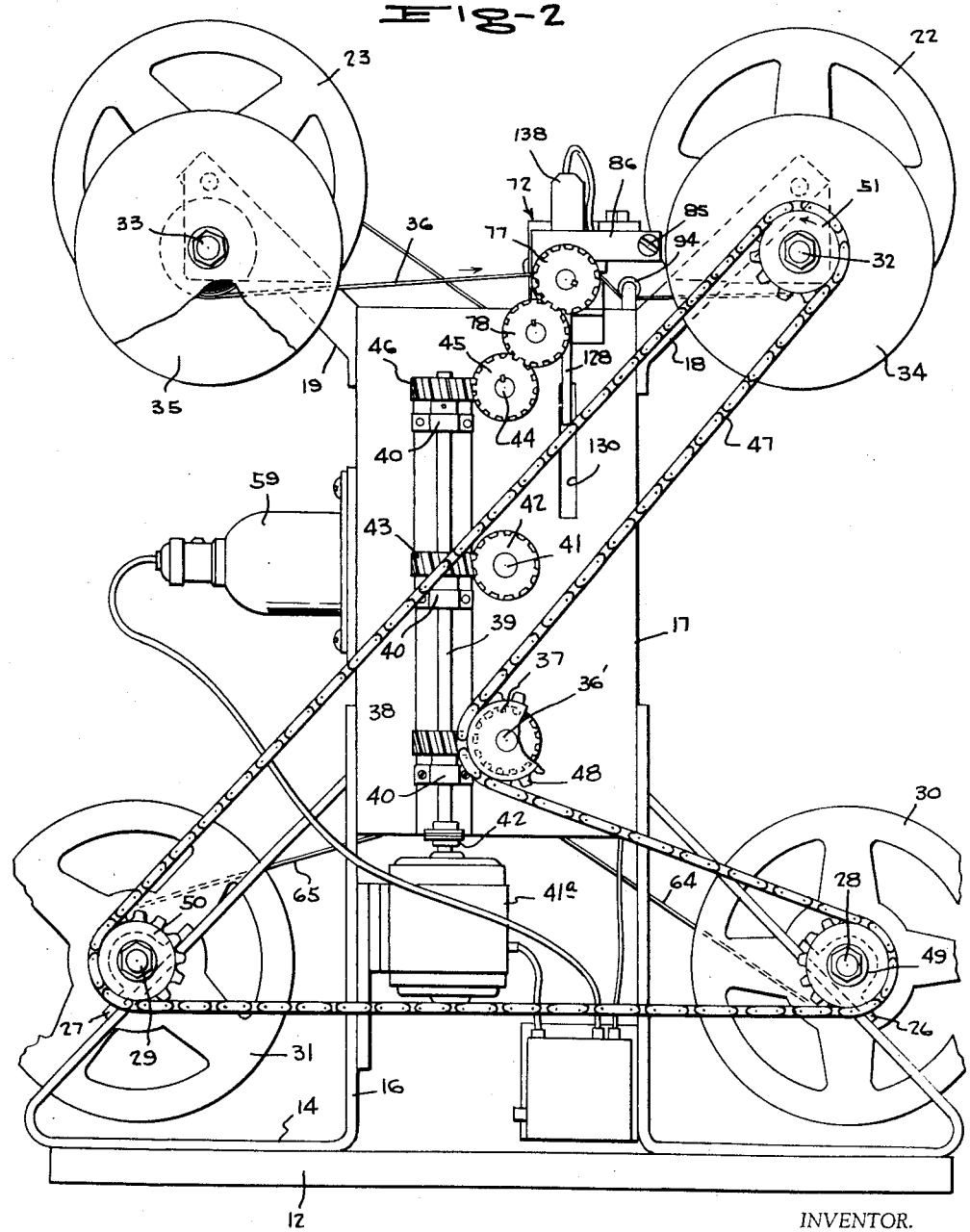

April 19, 1960    R. T. FRIEDEL    2,933,031
AUTOMATIC LIGHT CHANGER FOR MOTION PICTURE PRINTERS
Filed March 21, 1958    5 Sheets-Sheet 3
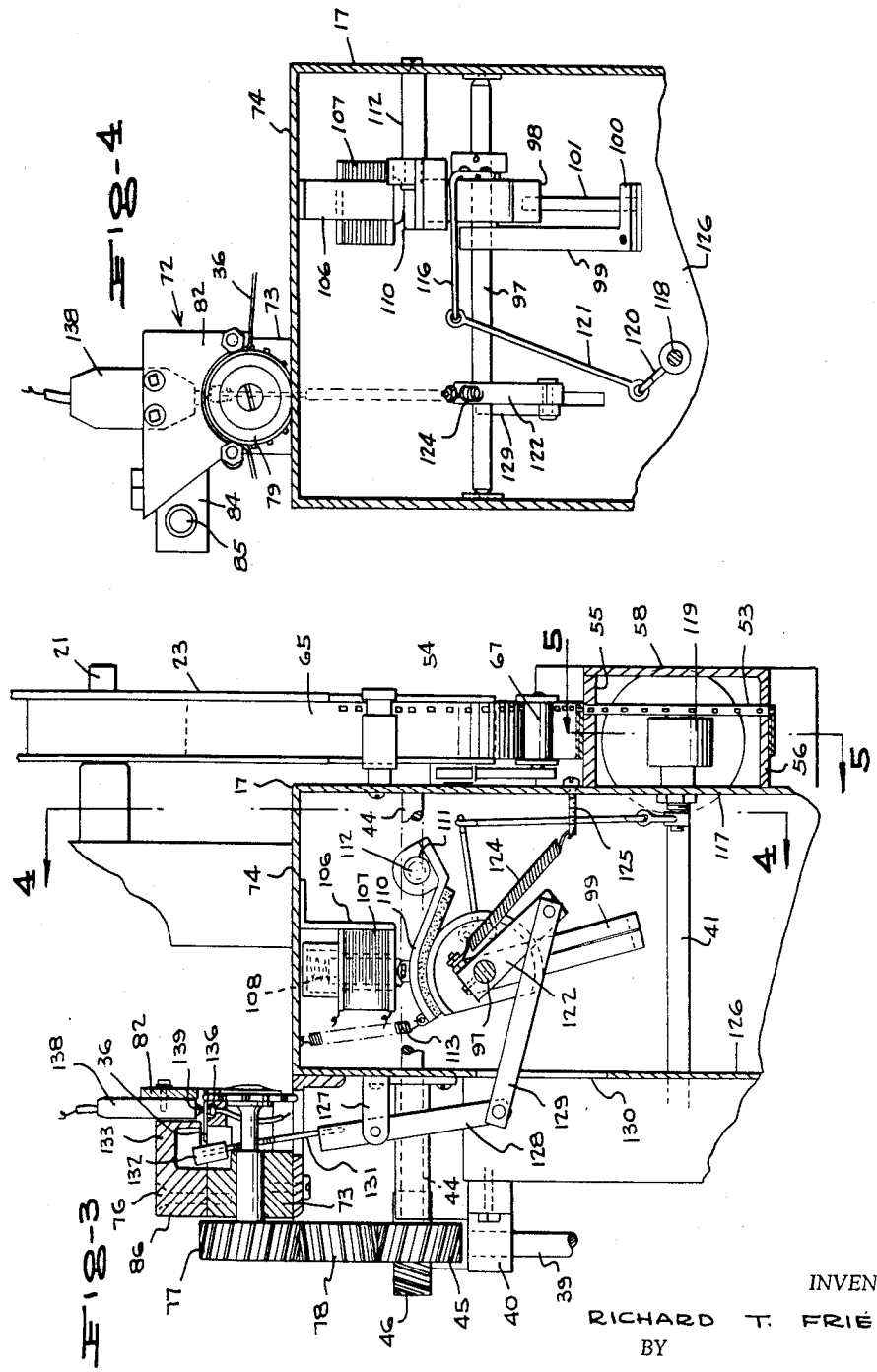
INVENTOR.
RICHARD T. FRIEDEL
BY
McMorrow, Berman + Davidson
ATTORNEYS April 19, 1960  R. T. FRIEDEL  2,933,031
AUTOMATIC LIGHT CHANGER FOR MOTION PICTURE PRINTERS
Filed March 21, 1958  5 Sheets-Sheet 4
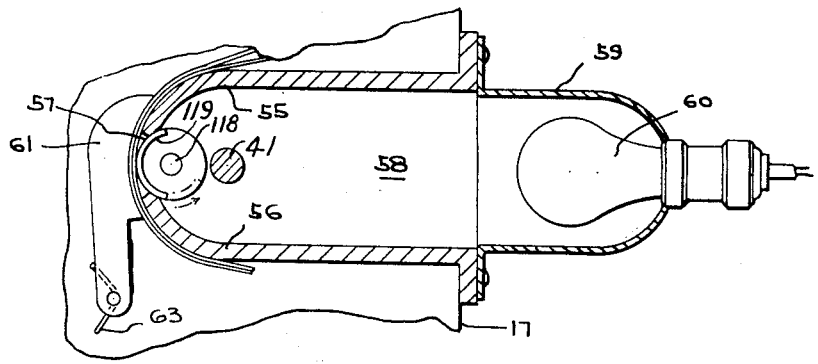
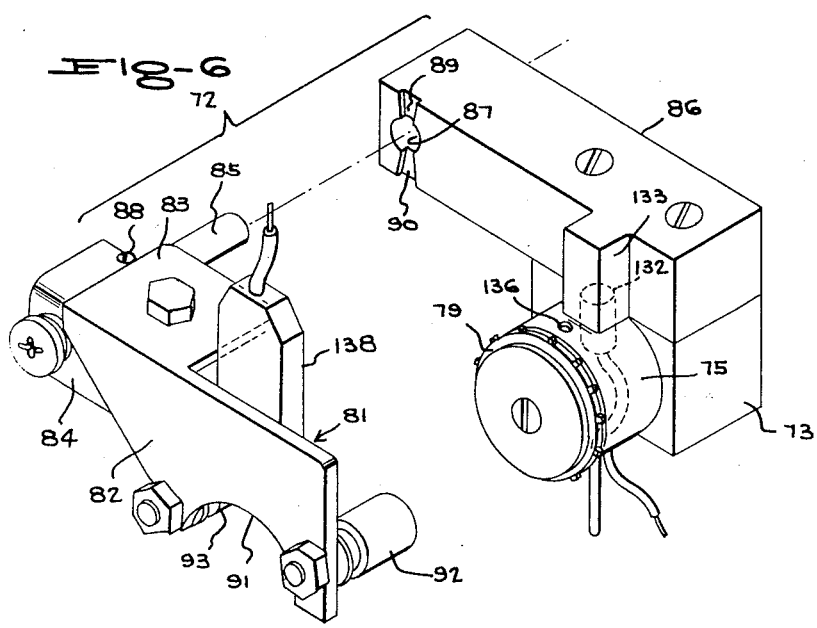
INVENTOR.
RICHARD T. FRIEDEL
BY
*McMorrow, Berman & Davidson*
ATTORNEYS

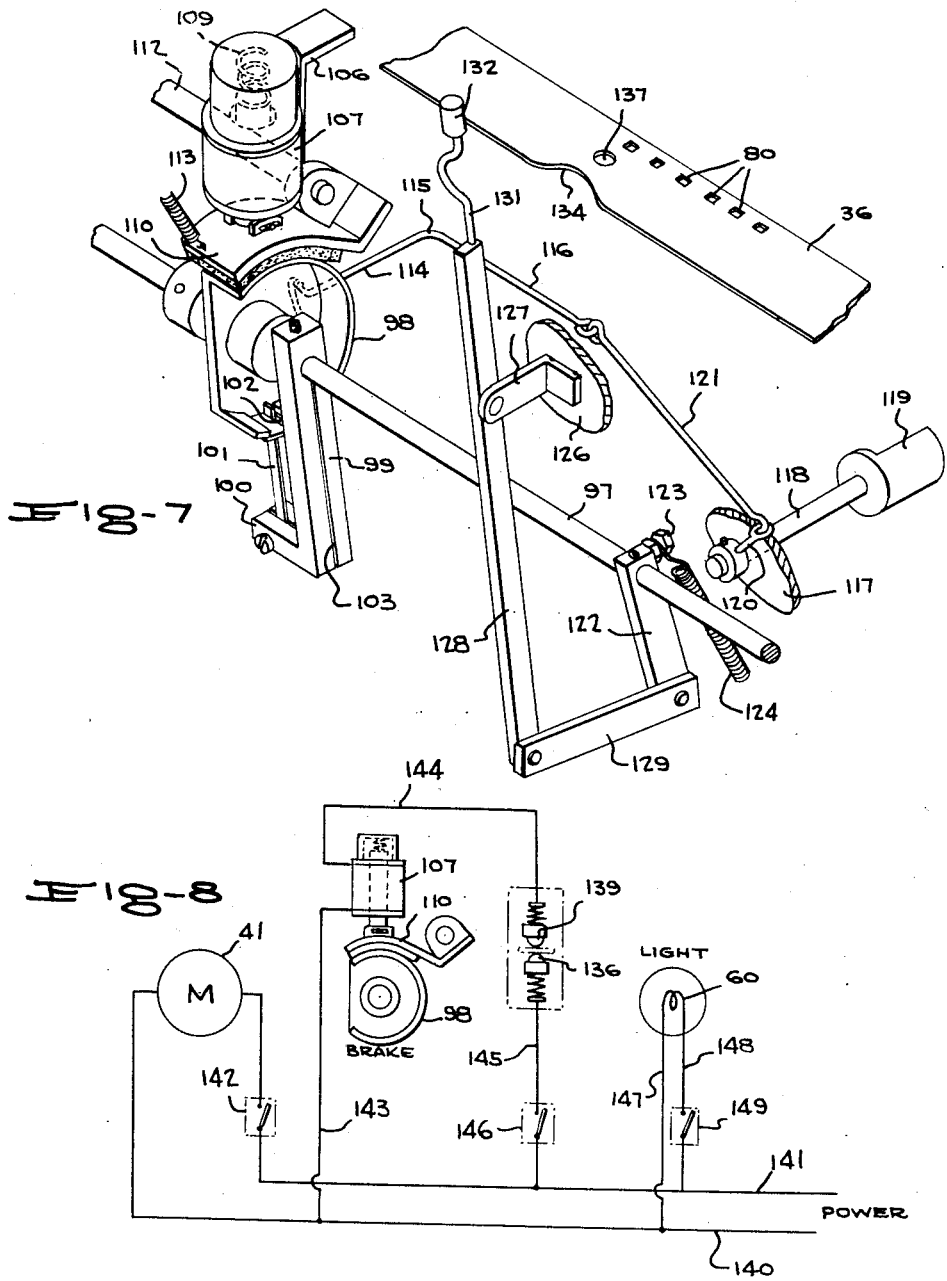

United States Patent Office 2,933,031
Patented Apr. 19, 1960

2,933,031

AUTOMATIC LIGHT CHANGER FOR MOTION PICTURE PRINTERS

Richard T. Friedel, Bell, Calif.

Application March 21, 1958, Serial No. 722,949

4 Claims. (Cl. 95—75)

This invention relates to apparatus for photographically printing motion picture film, and more particularly to a motion picture film printing device provided with means for automatically regulating the intensity of the printing light output in accordance with the density of the original film to be printed.

A main object of the invention is to provide a novel and improved motion picture film printing apparatus provided with means for automatically regulating the intensity of the printing light beam thereof, the apparatus being simple in construction, being relatively compact in size, and which does not require any manual adjustments to compensate for changes in density of the original film to be printed.

A further object of the invention is to provide an improved motion picture film printing apparatus which involves relatively inexpensive components, which is durable in construction, and which is arranged to automatically regulate the printing light intensity in accordance with the density of the original master film to be printed, whereby a large number of printed film copies may be made, each accurately identical in exposure, and each compensated in the same manner for variations in density of the master film.

A still further object of the invention is to provide an improved automatic light intensity regulating means for motion picture film printers, said means involving relatively few parts, being reliable in operation, and providing automatic changes in the intensity of the printing light even for very short scenes, in accordance with variations in density of the master film employed for making the prints.

Further objects and advantages of the invention will become apparent from the following description and claims, and from the accompanying drawings, wherein:

Figure 1 is a front elevational view, partly in vertical cross section, of an improved motion picture film printing apparatus constructed in accordance with the present invention.

Figure 2 is a rear elevational view of the apparatus of Figure 1.

Figure 3 is a fragmentary transverse vertical cross sectional view taken on the line 3—3 of Figure 1.

Figure 4 is a vertical cross sectional view taken on the line 4—4 of Figure 3.

Figure 5 is an enlarged cross sectional detail view taken on the line 5—5 of Figure 3.

Figure 6 is a perspective view of the cue track support assembly employed in the printing apparatus of Figures 1 to 5, the parts of the assembly being shown in separated positions.

Figure 7 is a fragmentary perspective view of the shutter operating mechanism and the linkage between the cue track and the mechanism, as employed in the apparatus of Figures 1 to 6.

Figure 8 is a circuit diagram showing the electrical connections employed in the apparatus of Figures 1 to 7.

Referring to the drawings, 11 generally designates a film printing apparatus according to this invention, said apparatus comprising a base 12 to which are secured the respective bottom bracket members 13 and 14, said bracket members having the upstanding vertical arms 15 and 16 which are located in parallel opposing relationship and between which is secured a generally rectangular housing 17. Secured to the top corner portions of housing 17 and extending above the respective bracket members 13 and 14 are the respective upwardly and outwardly inclined support brackets 18 and 19 on the upper ends of which are respectively journaled the transversely extending reel spindles 20 and 21. Spindle 20 is adapted to support the supply reel 22 containing raw stock film to be printed and spindle 21 is adapted to carry a reel 23 containing the master film ultimately to be reproduced.

The bottom bracket members 13 and 14 are provided with the respective inclined arms 24 and 25, and mounted on said arms are respective brackets 26 and 27 in which are journaled the respective transversely extending spindles 28 and 29. Spindle 28 is adapted to support the raw stock takeup reel 30 and spindle 29 is adapted to support the original master film takeup reel 31.

As will be readily understood, the respective spindles 20, 21, 28 and 29 are provided with conventional key elements adapted to engage in keyways formed in the bores of the reels 22, 23, 30 and 31, whereby the reels are keyed to the spindles for rotation therewith. The spindles are journaled at their inner portions to the respective bracket members 18, 19, 26 and 27 and project forwardly substantial distances, whereby to receive the respective reels thereon and whereby to allow the reels to be mounted on the spindles without interfering with the brackets.

Journaled to the upper bracket members 18 and 19 below the spindles 20 and 21 are respective additional transversely extending spindles 32 and 33 projecting rearwardly, namely, in directions opposite to the directions of the spindles 20 and 21, the spindles 32 and 33 supporting respective reels 34 and 35 for a cue track or strip 36 employed to regulate the printing light intensity, as will be presently described.

Transversely journaled in the lower portion of the housing 17 is a shaft 36' on which is secured a helical gear 37 which meshes with a mating helical gear 38 mounted on a vertical shaft 39 journaled to the rear wall of housing 17 in suitable bearing brackets 40. An electric motor 41 is secured to the upstanding arm 16 of bracket 14 with its shaft in alignment with shaft 39, the motor shaft being drivingly coupled to said shaft 39 by a suitable coupling assembly 42.

Motor 41' is preferably a slow speed motor, or a conventional motor provided with suitable speed reducing means to provide a substantial speed reduction at the output shaft 39. Thus, the speed is reduced so that the shaft 36' rotates at approximately 70 revolutions per minute.

Journaled transversely to the housing 17 above shaft 36' is an additional shaft 41 on which is mounted a helical gear 42 mating with and drivingly enmeshed with a helical gear 43 secured on the vertical shaft 39. Transversely journaled to the upper portion of housing 17 above shaft 41 is an additional shaft 44 on which is mounted a helical gear 45 mating with and drivingly in mesh with a helical gear 46 secured to the top end of shaft 39.

A sprocket chain 47 is engaged on respective sprocket wheels 48, 49, 50 and 51 secured on the respective transverse shaft 36' and spindles 28, 29 and 32, as is clearly shown in Figure 2, whereby said shaft and spindles are coupled together for simultaneous rotation, being driven by the shaft 36'. As viewed in Figure 2, the movement of the sprocket chain 47 is counterclockwise, whereby the takeup reels 31 and 30 rotate counterclockwise, as viewed in Figure 2, and whereby the cue track takeup reel 34, mounted on the spindle 32, likewise rotates counterclockwise.

Mounted on the forward ends of the respective transverse shafts 36, 41 and 44, adjacent the front wall of housing 17, are the respective film sprocket wheels 52, 53 and 54. The film sprocket wheels 52 and 54 are of normal width and are coplanar with the reels 30, 31, 22 and 23, the sprocket teeth thereof being adapted to engage with the sprocket holes in the film strips associated with said reels. The sprocket wheel 53 is coplanar with the sprocket teeth of the sprocket wheels 52 and 54, but is only substantially the width of the sprocket teeth, being arranged to guide the superimposed film strips over a pair of upper and lower arcuate guide plates 55 and 56 spaced at their ends by a light exposure aperture 57, as shown in Figure 5. Plates 55 and 56 comprise the top and bottom walls of a housing 58 which is secured to the front wall of the main housing 17 in a generally horiontal position, as shown in Figure 1, and which is aligned with a lamp housing 59 containing the printing light source 60, as is clearly shown in Figure 5. The source 60 comprises a lamp bulb of conventional construction.

The housing 58 is located between the upper and lower sprocket wheels 54 and 52, substantially in vertical alignment therewith, except that the relatively thin sprocket wheel 53 extends through slots provided in the upper and lower arcuate plate elements 55 and 56 so that the sprocket teeth of the wheel 53 may interengage with the sprocket holes in the film strips and guide the film strips around the outer surfaces of the curved plate elements 55 and 56. A retaining shoe 61 is pivoted at 62 to the front wall of the housing 17, the retaining shoe 61 being formed with a concave face conforming in curvature with the plate elements 55 and 56 and being engageable with the film strips supported thereon to hold said film strips against said curved plate elements 55 and 56, the shoe 61 being biased in a clockwise direction, as viewed in Figure 1, by suitable spring means shown at 63.

As shown in Figure 1, the raw stock film strip, designated at 64 is supplied from the feed reel 22 and is wound up on the takeup reel 30, whereas the master film strip, shown at 65 is supplied from the reel 23 and is wound up on the takeup reel 31. The respective film strips 64 and 65 engage over the sprocket wheel 54, passing between said sprocket wheel and a guide roller 66 journaled to the upper portion of the front wall of housing 17, as shown in Figure 1. The film strips 64 and 65 then pass around respective spring biased idler rollers 67 and 68, acting to maintain tension in the film strips, and around the curved supporting plates 55 and 56, engaging in superimposed relationship with the sprocket teeth of the sprocket wheel 53, whereby the superimposed film strips 64 and 65 are simultaneously moved around the curved plate members 55 and 56 and over the light exposure aperture 57. The film strips then engage on the sprocket wheel 52, passing between an upper guide roller 67 and sprocket wheel 52, and leaving the sprocket wheel 52 adjacent to a lower guide roller 68 pivoted to the front wall of housing 17. As shown in Figure 1, the exposed film strip 64 then is wound on the reel 30, whereas the master strip 65 is then wound on the reel 31.

Suitable springs, shown at 69 and 70 act on the supporting arms for the tension rollers 67 and 68, biasing said supporting arms in a counter-clockwise direction, as viewed in Figure 1, whereby suitable tension is maintained in the film strips 64 and 65 as they are moved around the curved supporting plate members 55 and 56. Designated generally at 72 is a cue track feed assembly which comprises a main supporting block 73 secured to the top wall 74 of housing 17 and being formed with a hollow drum-like projection 75 to which is journaled the transverse shaft 76. Mounted on the rear end of shaft 76 is a helical gear 77 which is drivingly coupled to the helical gear 45 by means of a helical idler gear 78 journaled to the rear wall of housing 17 between the gears 45 and 77, as shown in Figure 2. Secured on the forward end of shaft 76 is a sprocket wheel 79 whose teeth project beyond the periphery of the cylindrical projection 75, as shown in Figure 6, and are engageable with sprocket holes in the cue track strip 36. Said sprocket holes are shown at 80 in Figure 7.

Designated at 81 is the hinged upper member of the cue track feed assembly, said upper member comprising a vertical plate 82 provided with a flange 83 to which is secured an angle bracket 84 in which is threadedly fastened the transversely extending pivot pin 85. Secured to the block 73 is an arm 86 which is formed at its rear end portion with a transverse bore 87 in which the pin 85 is receivable whereby to hingedly connect the member 81 to the arm 86. A stop projection 88 is provided on the inner edge of the flange of angle bracket 84, said projection being engageable in detent grooves 89 and 90 formed in arm 86 above and below the bore 87, whereby to limit the rotation of the member 81 when said member is disposed adjacent to the arm 86. Thus, when the stop projection 88 engages in the upper groove 89, the member 82 will be held over the cylindrical projection 75 and its rotation will be limited to a relatively small angle. The member 81 may be slightly extended from the arm 86 and then rotated counter-clockwise, as viewed in Figure 6, to an oppositely extending position wherein the stop projection 88 may enter the lower groove 90, to hold the member 81 in a position rotated 180° from that shown in Figure 6, when so desired.

The vertical plate member 82 is formed with the arcuate notch 91 which is engageable over the outer portion of the sprocket wheel 79 to retain the cue track film strip in engagement with said sprocket wheel, the plate member 82 being provided with the respective rollers 92 and 93 engageable with the cue track at the opposite sides of the drum element 75 to further retain the cue track film strip on the drum member 75 as the strip is moved thereover.

As shown in Figures 1 and 2, a transversely extending guide roller 94 is provided on the top wall of housing 17 between the cue track feed assembly 72 and the cue track takeup reel 34, the cue track 36 passing beneath the guide roller 94 and being wound up on the takeup reel 34, as is clearly shown in Figure 2.

Journaled in the side walls of the housing 17 below and transverse to the shaft 44 is a horizontal shaft 97 (Figure 3) on which is rotatably mounted a brake drum member 98. Secured to shaft 97 adjacent drum member 98 is an arm 99 formed at its outer end with a right-angled portion 100. A leaf spring 101 connects the outer portion 100 of arm 99 to a peripheral portion of the drum member 98, as shown in Figure 7, the inner end of the leaf spring 101 being engaged in a slot 102 formed in said peripheral portion and the outer end of the leaf spring 101 being clamped between the respective segments of the arm 99 defined by a slot 103 formed therein and extending in the longitudinal central plane thereof, as is clearly shown in Figure 7. Thus, the arm 99 is yieldably connected to the drum member 98 through the leaf spring 101.

Secured to the top wall 74 in the housing 17 is a bracket 106 supporting a solenoid 107 having the vertical plunger 108 which is biased downwardly by a coiled spring 109 contained in the upper end of the plunger casing and bearing between the upper wall of said casing and the top end of the plunger 108. The bottom end of the plunger 108 is pivotally connected to a brake shoe 110, said brake shoe 110 being pivotally connected at 111 to the end of a horizontally extending pivot rod 112 rigidly secured to one of the side walls of housing 17.

Brake shoe 110 is normally biased downwardly into braking engagement with the peripheral surface of the drum member 98 by the force of spring 109. A relatively light coiled spring 113 connects the outer end portion of the brake shoe 110 to the top wall 74, the spring 113 being insufficient to overcome the force of the main biasing spring 109 but cooperating with the solenoid 107 when energized to elevate the brake shoe member 110 against the force of the main biasing spring 109.

Rigidly connected to the drum member 98 and projecting outwardly therefrom is a rod 114 which is bent substantially at right angles at 115 and which is provided with the outer portion 116 extending substantially parallel to shaft 97. Journaled in the front wall of housing 17, designated at 117, is a shaft 118 which extends into the light exposure housing 58 and which is provided at its end with and arcuately curved shutter element or member 119 disposed in the end portion of the light exposure housing 58 and being adapted to cover the light exposure aperture 57 to a degree depending upon the degree of rotation of shaft 118. The inner end of shaft 118 is provided with the outwardly projecting arm 120 which is connected to the end of the rod portion 116 by a link rod 121, whereby shaft 118 rotates responsive to rotation of the drum member 98 to thereby vary the angular position of the shutter element 119.

As will be readily understood, the shaft 97 and arm 99 may rotate through a substantial angle relative to the drum member 98 because of the yieldability of leaf spring 101. Normally, the drum member 98 is held stationary by the action of the brake shoe 110. However, when the brake shoe 110 is elevated, the spring 110 acts to rotate the drum member 98 to relieve the tension in the spring 101, whereby the drum member 98 is rotated to an amount corresponding to the rotation of the shaft member 97.

Rigidly secured to the shaft 97 is an arm 122, the arm 122 being provided with a clamping screw 123 projecting therefrom, as shown in Figure 7. A coiled spring 124 is connected between the end of the screw 123 and an anchor screw 125 secured in wall 117, as shown in Figure 3, whereby the arm 122 and shaft 97 are biased clockwise, as viewed in Figure 7. The rear wall of housing 17, designated at 126, has secured thereto a pivot bracket 127, and pivoted at its intermediate portion to bracket 127 is a lever 128. The lower end of lever 128 is connected by a link bar 129 to the end of the arm 122, the link bar 129 extending through a vertical slot 130 formed in rear wall 126 of housing 17. Rigidly secured to the top end of lever 128 is a rod 131 which extends upwardly through the cylindrical forward portion 75 of the block member 73 and which is provided at its top end with a follower roller 132 which is received in a hollow projection 133 formed on the arm 86, as shown in Figures 3 and 6, the top wall portion of the cylindrical member 75 being suitably notched to allow the follower roller 32 to project upwardly therethrough. As is clearly shown in Figure 3, the roller 132 is engageable with the edge of the cue track strip 36 opposite the sprocket holes 80 of said cue strip. Coiled spring 124 biases the lever member 128 in a clockwise direction, as viewed in Figure 7, whereby the roller 132 is urged into engagement with the edge of the cue track strip 36. The edge of the cue track strip 36 is suitably contoured, for example, is formed with cam-like notches 134, in accordance with the density characteristics of the master film 65 to be printed, whereby the setting of the shutter element 119 is regulated in accordance with the location and shape of the irregularities 134 in the edge of the cue track strip 36.

Designated at 136 is a bottom contact element which is mounted in the top wall portion of the cylindrical member 75 outwardly adjacent to the housing member 133, as shown in Figure 6, the contact member 136 being suitably insulated from the member 75 and being registrable with apertures 137 provided in the cue track strip 36 adjacent the respective notched edge portions 134. Secured to the vertical flange 82 above and in registry with the contact element 136 is an insulated contact holder 138 provided at its bottom with a contact element 139 adapted to engage the contact element 136 through an aperture 137 when such aperture is located between the opposing contact elements. Suitable spring means, not shown, resiliently urge contact 139 toward contact 136, the contacts being normally separated by the cue track strip 36, but being allowed to come into conductive engagement with each other whenever an aperture 137 comes into registry with the opposing contact elements 136 and 139.

The cue track strip 36 is similar to a conventional motion picture film strip and is provided with the spocket holes 80, as above described, whereby the cue track strip 36 is moved in synchronism with the master film strip 65 and the raw stock film 64. The cue track strip 36 is prepared with the notched portions 134 and the contact openings 137, in accordance with the density characteristics of the master film strip 65 so that the apparatus will compensate for such density variations as may be present in the master film 65 and will adjust the shutter element 119 so that the density of the print obtained will be substantially uniform. The gear trains driving the cue track 36 are suitably proportioned so that said cue track moves at a speed proportional to the speed of movement of the master film 65 and raw stock film 64, preferably at a substantially slower speed, whereby the cue track strip 36 may be considerably shorter in length than the master film and raw stock film. By providing slower movement of the cue track strip 36, wear on the cue track strip is minimized and said strip may be employed for printing a large number of copies without serious deterioration thereof.

The cue track strip 36 is notched to various depths to compensate for the variations in density in the master film, and any suitable size of motion picture strip film may be used therefor.

As shown in Figure 8, the motor 41a is connected to respective power supply wires 140 and 141 through a motor control switch 142. The solenoid 107 has one terminal thereof connected to the power supply wire 140 by a wire 143 and has its other terminal connected by a wire 144 to the upper contact element 139. The lower contact element 136 is connected to the line wire 141 through a wire 145 and a control switch 146. The lamp 60 has one terminal thereof connected to the power supply wire 140 by a wire 147 and has the other terminal thereof connected to the wire 141 by a wire 148 and a control switch 149.

In operation, when the roller follower 132 engages in a notch portion 134, the spring 124 causes the arm 122 to rotate shaft 97 clockwise, as viewed in Figure 7, thus flexing the leaf spring 101. When the contacts 139, 136 engage each other through the aperture 137 adjacent the notch 134, the solenoid 107 becomes energized, elevating the brake shoe 110, thereby releasing the drum member 98. The drum member then rotates until the spring 101 is relieved of tension, causing the shaft 118 to be rotated and causing the arcuate shutter element 119 to be similarly rotated, in accordance with the depth of the groove 134, namely, to a position compensating for a specific density condition in the master film 65. As the cue track strip 36 moves on, the contacts 136 and 139 are separated, whereby solenoid 107 becomes de-energized, allowing the biasing spring 109 of the solenoid plunger to force said plunger downwardly and to cause the shoe 110 to engage the periphery of the drum member 98, locking the drum member in its adjusted position until the solenoid 107 again becomes energized.

The cue track strip 36 is moved over the cylindrical guide member 75 by the action of the sprocket wheel 79, said cue track strip being wound up on the reel 34 and unwinding from the supply reel 35.

As above explained, the member 81 may be rotated to a position 180° from the position thereof shown in Figure 1 by moving same outwardly sufficiently to allow projection 88 to disengage from groove 89, whereby the member 81 may be rotated to an out-of-the-way position to allow the cue track film strip to be threaded between the projection 133 and the cylindrical member 75 when installing the cue track film strip in the apparatus preparatory to a printing operation. After the cue track film strip has been placed on the member 75 with the sprocket teeth of sprocket wheel 79 engaged in the sprocket holes 80 of the film strip, the member 81 may be rotated to its normal position, wherein the rollers 92 and 93 engage the cue track film strip at the opposite sides of the cylindrical member 75, whereby the film strip will be accurately held on member 75 and whereby the edge portion thereof will be engaged by the follower roller 132.

As will be readily understood, the cue track feed assembly 72 and the parts controlled thereby may be made up and sold as an attachment for existing printers of conventional construction, and can be attached to continuous contact printers for the various different sizes of film, such as 16 mm., 35 mm., etc.

Furthermore, the invention may be employed as an automatic light changer on optical printers as well as on printers of the continuous contact type.

While a specific embodiment of an improved apparatus for printing motion picture film and similar strip film has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a printing apparatus for strip film, a support, a lamp housing on said support, an exposure lamp in said housing, said housing being formed with an exposure aperture, a shutter member movably mounted in said housing adjacent said aperture and being movable to regulate the amount of light passing therethrough, a master film strip, means formed and arranged to guide the master film strip and a raw stock film strip in superimposed relation over said aperture, cue track film strip guide means on said support, a cue track film strip on said cue track strip guide means, means longitudinally moving said cue track film strip and master film strip simultaneously at proportional speeds, said cue track film strip being formed with irregularities in an edge portion thereof corresponding to variations in density of the master film strip, follower means on the support engaging said edge portion and arrange to adjust said shutter member in accordance with said irregularities, said cue track strip being apertured adjacent the irregularities in its edge portion, contact elements on the support engaging the opposite surfaces of the cue track strip in alignment with the apertures and being engageable with each other when registering with an aperture, a rotatable shaft, a rotary member rotatable about said shaft, means on said shaft and rotatable with the latter, means drivingly connecting said follower means to said last-named means, a brake member engaging said rotary member and normally preventing rotation thereof, electromagnetic means operatively connected to said brake member and arranged to release said brake member when energized, and means drivingly connecting said shutter member to said rotary member and operable to retard adjustment of the shutter member until said contact elements engage through an aperture in the cue track strip, the electromagnetic means has been energized, and the brake member has been released from engagement with said rotary member.

2. In a printing apparatus for strip film, a support, a lamp housing on said support, an exposure lamp in said housing, said housing being formed with an exposure aperture, a shutter member movably mounted in said housing adjacent said aperture and being movable to regulate the amount of light passing therethrough, a main guide sprocket wheel rotatably mounted on the support adjacent said exposure aperture and being formed and arranged to guide a master film strip and a raw stock film strip in superimposed relation over said aperture, a cue track strip guide sprocket wheel rotatably mounted on the support, means coupling said sprocket wheels together for simultaneous rotation, a cue track film strip, means supporting said cue track film strip in driving engagement with said second-named sprocket wheel, said cue track film strip being formed with irregularities in an edge portion thereof, follower means on the support engaging said edge portion and arranged to adjust said shutter member in accordance with said irregularities, said cue track strip being apertured adjacent the irregularities in its edge portion, contact elements on the support engaging the opposite surfaces of the cue track strip in alignment with the apertures and being engageable with each other when registering with an aperture, a rotatable shaft, a rotary member rotatable about said shaft, means on said shaft and rotatable with the latter, means drivingly connecting said follower means to said last-named means, a brake member engaging said rotary member and normally preventing rotation thereof, electromagnetic means operatively connected to said brake member and arranged to release said brake member when energized, and means drivingly connecting said shutter member to said rotary member and operable to retard adjustment of the shutter member until said contact elements engage through an aperture in the cue track strip, the electromagnetic means has been energized, and the brake member has been released from engagement with said rotary member.

3. In a printing apparatus for strip film, a support, a lamp housing on said support, an exposure lamp in said housing, said housing being formed with an exposure aperture, a shutter member movably mounted in said housing adjacent said aperture and being movable across said aperture to regulate the amount of light passing therethrough, drive means formed and arranged to move a master film strip and a superimposed raw stock film strip over said aperture, a cue track film strip formed with irregularities in one edge thereof, means supporting said cue track film strip, means engaging said cue track strip and coupled with said drive means to move the cue track film strip simultaneously with said drive means, follower means movably mounted on the support and engaging said one edge of the cue track film strip, crank means rotatably mounted on said support, means drivingly connecting said crank means to said follower means, a rotary member rotatably mounted on the support coaxially with said crank means, means divingly connecting said rotary member to said shutter member, spring means connecting said rotary member to said crank means, a brake member engaging said rotary member and normally preventing rotation thereof, electromagnetic means operatively connected to said brake member and being formed and arranged to release said brake member when energized, said cue track film strip being formed with apertures adjacent said irregularities in its edge, respective contacts mounted on the support above and below the cue track film strip in alignment with said last-named apertures and being engageable therethrough, and an energizing circuit connected to said electromagnetic means and including said contacts, whereby to energize said electromagnetic means and release said brake member substantially at the same time that the follower means engages the irregularities, whereby to adjust said shutter member.

4. In a printing apparatus for strip film, a support, a lamp housing on said support, an exposure lamp in said housing, said housing being formed with an exposure aperture, a shutter member movably mounted in said housing adjacent said aperture and being movable across said aperture to regulate the amount of light passing therethrough, drive means formed and arranged to move a master film strip and a superimposed raw stock film strip over said aperture, a cue track film strip formed with irregularities in one edge thereof, means supporting said cue track film strip, a sprocket wheel rotatably mounted on the support adjacent said cue track film strip supporting means, said cue track film strip being formed with longitudinally spaced sprocket holes engaged with said sprocket wheel, means drivingly coupling said sprocket wheel to said drive means to move the cue track film strip simultaneously with said drive means, follower means movably mounted on the support and engaging said one edge of the cue track film strip, crank means rotatably mounted on said support, means drivingly connecting said crank means to said follower means, a rotary member rotatably mounted on the support coaxially with said crank means, means drivingly connecting said rotary member to said shutter member, spring means connecting said rotary member to said crank means, a brake member engaging said rotary member and normally preventing rotation thereof, electromagnetic means operatively connected to said brake member and being formed and arranged to release said brake member when energized, said cue track film strip being formed with apertures adjacent said irregularities in its edge, respective contacts mounted on the support above and below the cue track film strip in alignment with said last-named aperture and being engageable therethrough, and an energizing circuit connected to said electromagnetic means and including said contacts, whereby to energize said electromagnetic means and release said brake member substantially at the same time that the follower means engages the irregularities, whereby to adjust said shutter member at predetermined positions of the cue track film strip on its support means.

References Cited in the file of this patent

UNITED STATES PATENTS

| | | |
|---|---|---|
| 1,803,404 | Owens | May 5, 1931 |
| 2,065,057 | Debrie | Dec. 22, 1936 |
| 2,079,960 | Fear | May 11, 1937 |